United States Patent
Kim et al.

(10) Patent No.: US 9,552,148 B2
(45) Date of Patent: Jan. 24, 2017

(54) DISPLAY DEVICE MOUNTED ON STEERING WHEEL OF VEHICLE AND CONTROL METHOD THEREOF

(71) Applicant: LG ELECTRONICS INC., Seoul (KR)

(72) Inventors: Kihyeon Kim, Seoul (KR); Kyutae Hwang, Seoul (KR); Sukjin Chang, Seongnam-si (KR); Sangjoon Park, Seoul (KR); Taenyon Kim, Yongin-si (KR); Sungje An, Seongnam-si (KR); Euihwan Bae, Gunpo-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/434,875

(22) PCT Filed: Oct. 11, 2012

(86) PCT No.: PCT/KR2012/008262
§ 371 (c)(1),
(2) Date: Apr. 10, 2015

(87) PCT Pub. No.: WO2014/058087
PCT Pub. Date: Apr. 17, 2014

(65) Prior Publication Data
US 2015/0286385 A1    Oct. 8, 2015

(51) Int. Cl.
*B60Q 1/00*      (2006.01)
*G06F 3/0484*    (2013.01)
*B62D 1/04*      (2006.01)
*B62D 1/10*      (2006.01)
(Continued)

(52) U.S. Cl.
CPC ........... *G06F 3/04847* (2013.01); *B60K 37/00* (2013.01); *B60Q 5/003* (2013.01); *B62D 1/046* (2013.01);
(Continued)

(58) Field of Classification Search
CPC    G06F 3/04847; G06F 3/04817; G06F 3/0482; G06F 3/04842; B60K 37/00; B60K 5/003
(Continued)

(56) References Cited

U.S. PATENT DOCUMENTS 5,666,102 A * 9/1997 Lahiff ................... B60Q 3/044
340/438
5,691,695 A * 11/1997 Lahiff ................... B60K 37/02
340/439

(Continued)

FOREIGN PATENT DOCUMENTS

EP    1 958 814 A1    8/2008
JP    7-205682 A      8/1995
(Continued)

*Primary Examiner* — Eric M Blount
(74) *Attorney, Agent, or Firm* — Birch, Stewart, Kolasch & Birch, LLP

(57) ABSTRACT

A display device installed on a steering wheel of a vehicle. The display device includes a display configured to display a GUI (Graphic User Interface) having an indicator indicating a rotation of the steering wheel; a sensing unit configured to sense whether or not the steering wheel is rotated; and a controller configured to rotate the displayed GUI in an opposite direction of a rotation direction of the steering wheel, when the steering wheel is rotated, and change a gauge of the indicator according to an amount of the rotation of the steering wheel.

18 Claims, 12 Drawing Sheets

(51) Int. Cl.
*B60Q 5/00* (2006.01)
*B60K 37/00* (2006.01)
*G06F 3/0481* (2013.01)
*G06F 3/0482* (2013.01)

(52) U.S. Cl.
CPC .............. *B62D 1/10* (2013.01); *G06F 3/0482* (2013.01); *G06F 3/04817* (2013.01); *G06F 3/04842* (2013.01)

(58) Field of Classification Search
USPC ........................................................ 340/461
See application file for complete search history.

(56) References Cited

U.S. PATENT DOCUMENTS

| | | | | |
|---|---|---|---|---|
| 5,821,935 A | * | 10/1998 | Hartman | B60K 37/06 340/438 |
| 6,300,939 B1 | * | 10/2001 | Decker | B60K 35/00 345/157 |
| 6,739,620 B2 | | 5/2004 | Derrick | |
| 7,414,520 B2 | * | 8/2008 | Mei.beta.ner | B60K 37/06 340/438 |
| 7,786,886 B2 | * | 8/2010 | Maruyama | B60K 35/00 340/438 |
| 2008/0023254 A1 | * | 1/2008 | Prost-Fin | B60K 35/00 701/41 |
| 2008/0061954 A1 | * | 3/2008 | Kulas | B60K 35/00 340/438 |
| 2009/0189373 A1 | * | 7/2009 | Schramm | B60K 35/00 701/36 |
| 2014/0062891 A1 | * | 3/2014 | Powell | B62D 1/046 345/173 |

FOREIGN PATENT DOCUMENTS

| | | |
|---|---|---|
| WO | WO 98/03365 A1 | 1/1998 |
| WO | WO 98/03366 A1 | 1/1998 |

\* cited by examiner

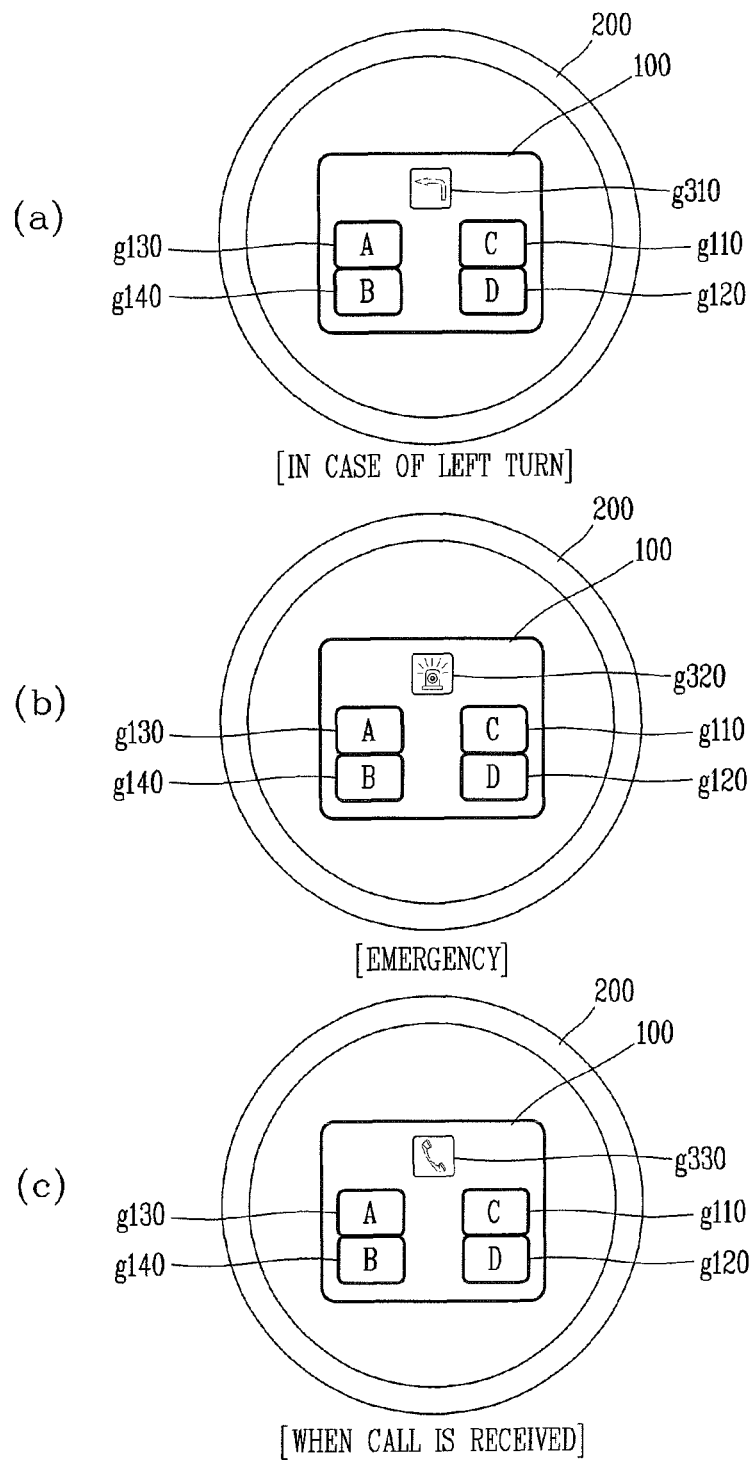

US 9,552,148 B2

DISPLAY DEVICE MOUNTED ON STEERING WHEEL OF VEHICLE AND CONTROL METHOD THEREOF

This application is a National Phase of PCT International Application No. PCT/KR2012/008262, filed on Oct. 11, 2012, which is incorporated by reference in its entirety.

TECHNICAL FIELD

The present disclosure relates to a display device installed on a steering wheel of a vehicle and providing a graphic user interface (GUI) rotating based on a rotation of the steering wheel, and a control method thereof.

BACKGROUND ART

A steering wheel is a device for changing a direction of a rotational shaft of front wheels in order to change a proceeding direction of a vehicle, which may also be called a handle.

An inner side of the steering wheel may be made of a light alloy and an outer side thereof may be made of a synthetic resin. Namely, in order to reduce injury to a driver, such as striking a driver a heavy blow on the chest, in the occurrence of a collision, a material that absorbs collision energy may be used to enhance a safety grade.

Also, installation of air bags as an impact buffer, as standard equipment, in the center of the steering wheel has been increased.

The driver may adjust a running direction of a vehicle by horizontally rotating the steering wheel, and a steering column forming a shaft of the steering wheel transfers an operating force of the driver to a lower steering gear, and the steering gear may steer the vehicle by moving the wheels of the vehicle.

Currently, in a majority of vehicles, a hardware type button is attached to a steering wheel in order to stably control a radio operation, a hands-free function, and the like while driving.

Also, recently, a display device installed in a steering wheel in consideration of driver's convenience in operation, and the like, has emerged.

Namely, a recent trend is that a display device such as a liquid crystal display (LCD) is also attached to a steering wheel to provide various types of information to a user (or a driver).

In this case, however, an LCD monitor is simply attached to a steering wheel and image information displayed thereon is rotated as the steering wheel is turned, resulting in a degradation of user's visibility and operability while driving, causing user inconvenience.

In particular, such a type may have great shortcomings when the display device displays directional information (arrows, or the like).

SUMMARY OF THE INVENTION

Therefore, an aspect of the detailed description is to provide a display device installed on a steering wheel of a vehicle and providing a graphic user interface (GUI) rotating based on a rotation of the steering wheel, and a control method thereof.

To achieve these and other advantages and in accordance with the purpose of this specification, as embodied and broadly described herein, a display device includes: a display unit for displaying a GUI (Graphic User Interface) on a screen; a sensing unit for sensing whether or not the steering wheel is rotated; and a controller for controlling the display unit to rotate a GUI element included in the GUI in an opposite direction of the rotation direction of the steering wheel so as to be displayed on the screen, when the steering wheel is rotated.

In an example in relation to the present disclosure, the GUI element may be at least one of an indicator indicating information regarding running of the vehicle, an indicator indicating a state of the vehicle, an indicator in relation to a device connected to the vehicle, an indicator in relation to a terminal connected to the vehicle, an image obtained by capturing the outside of the vehicle, and a touch button.

In an example in relation to the present disclosure, the steering wheel may be rotated based on a first axis, and the GUI element may be rotated based on a second axis.

In an example in relation to the present disclosure, the first axis may be a rotation central axis of the steering wheel, and the second axis may be the same as the first axis.

In an example in relation to the present disclosure, the sensing unit may detect a rotation angle of the steering wheel.

In an example in relation to the present disclosure, the rotation angle of the steering wheel may be detected based on a first reference axis.

In an example in relation to the present disclosure, the first reference axis may be vertical to or cross (or intersect with) the rotation central axis of the steering wheel.

In an example in relation to the present disclosure, the controller may rotate the GUI element by a particular angle based on the detected rotation angle of the steering wheel.

In an example in relation to the present disclosure, the controller may rotate the GUI element such that an absolute value of the particular angle is equal to an absolute value of the rotation angel of the steering wheel.

In an example in relation to the present disclosure, the particular angle may be determined based on the second reference axis.

In an example in relation to the present disclosure, the second reference axis may be vertical to the rotation central axis of the steering wheel and may be parallel to the first reference axis.

In an example in relation to the present disclosure, the controller may provide an editing function with respect to the GUI.

In an example in relation to the present disclosure, the editing function may be a function of setting at least one of a type, size, a shape, a kind, a position, a color of a GUI element displayed on the screen, or whether the GUI element is rotated according to a rotation of the steering wheel.

In an example in relation to the present disclosure, the controller may activate the editing function based on a user selective input, and perform an editing function on the GUI based on the user's editing input.

In an example in relation to the present disclosure, the sensing unit may detect situation information regarding the vehicle, and the controller may control the display unit to display a particular GUI to be displayed on the screen based on the sensed situation information.

In an example in relation to the present disclosure, the situation information regarding the vehicle may be information regarding at least one of an operation state of the vehicle, a running situation of the vehicle, an emergency situation of the vehicle, a state of a device connected to the vehicle, and a state of a terminal connected to the vehicle.

In an example in relation to the present disclosure, the controller may determine a particular GUI element to be displayed on the screen based on the sensed situation information, and the particular GUI may include the particular GUI element.

In an example in relation to the present disclosure, the particular GUI may include a particular GUI element corresponding to the sensed situation information, and the particular GUI element may be previously set based on a user input.

In an example in relation to the present disclosure, the display unit may be disposed on a central portion or an edge portion of the steering wheel.

To achieve these and other advantages and in accordance with the purpose of this specification, as embodied and broadly described herein, a control method of a display device includes: a step of displaying a GUI (Graphic User Interface) in relation to a vehicle; a step of determining whether a steering wheel of the vehicle is rotated; and a step of rotating a GUI element included in a GUI in an opposite direction of a rotation direction of the steering wheel and displaying the GUI element on a screen, when the steering wheel is rotated.

According to an embodiment disclosed in the present disclosure, a display device mounted on a steering wheel of a vehicle and providing a GUI rotated based on a rotation of the steering wheel, and a control method thereof are provided.

According to an embodiment disclosed in the present disclosure, a GUI synchronized according to a movement (or a rotation) of the steering wheel is provided, so visibility and operability with respect to the GUI of a user can be increased.

BRIEF DESCRIPTION OF DRAWINGS

FIG. 6 is an exemplary view illustrating a display device according to a fourth embodiment disclosed in the present disclosure;

DETAILED DESCRIPTION OF EMBODIMENTS OF THE INVENTION

Figure 1:
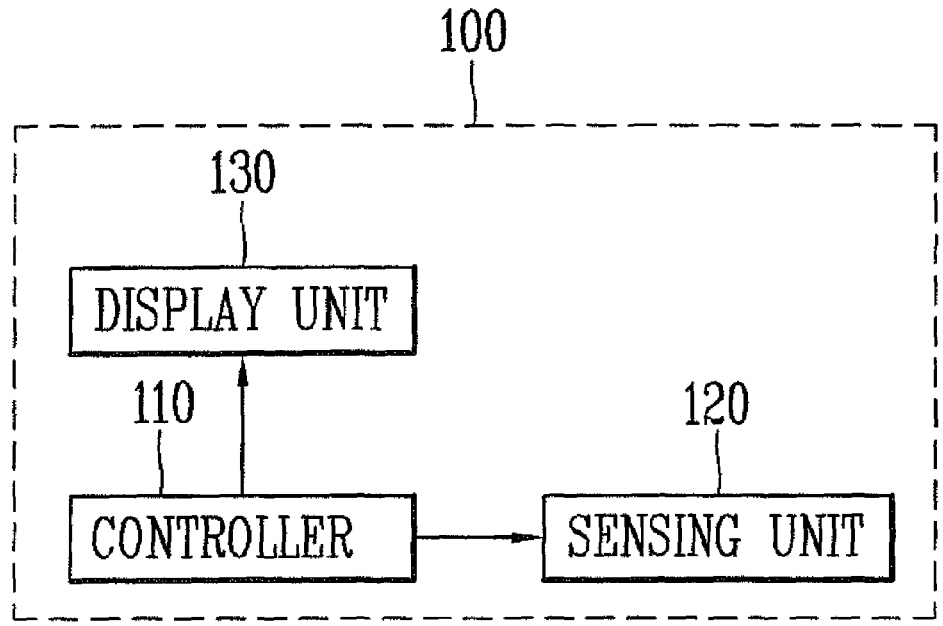
FIG. 1 is a block diagram illustrating a configuration of a display device according to an embodiment disclosed in the present disclosure.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Description will now be given in detail of the exemplary embodiments, with reference to the accompanying drawings. For the sake of brief description with reference to the drawings, the same or equivalent components will be provided with the same reference numbers, and description thereof will not be repeated.

A technique disclosed in the present disclosure may be applied to a display device installed on a steering wheel of a vehicle. However, without being limited thereto, the technique disclosed in the present disclosure may also be applied to every image display device, image display system, portable device, multimedia device, terminal, equipment, and a device that may be able to execute an application in relation to multimedia, and a control method thereof.

For example, a portable device is a small terminal device manufactured to allow a user to perform inputting with the portable device held in his hand while on the move, which may include a mobile communication terminal such as a portable phone, a personal digital assistant (PDA), a portable digital multimedia broadcasting (DMB) terminal, an MPEG layer 3 (MP3) player, a portable multimedia player (PMP), a portable game player such as a playstation portable (PSP), and the like.

Also, for example, the technique disclosed in the present disclosure may be applied to various terminals such as a smart phone, a portable terminal, a mobile terminal, a personal digital assistant (PDA), a portable multimedia player (PMP) terminal, a notebook computer, a Wibro terminal, an Internet protocol television (IPTV) terminal, a digital broadcast terminal, a telematics terminal, a navigation terminal, an audio video navigation (AVN) terminal, a television, a 3D television, an audio/video (A/V) system, a home theater system, an information providing center, a call center, and the like.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

The exemplary embodiments of the present invention will now be described with reference to the accompanying drawings, in which like numbers refer to like elements throughout.

In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Display Device According to Embodiments Disclosed in the Present Disclosure

A display device according to embodiments of the present disclosure is a display device installed on a steering wheel of a vehicle, which may include a display unit for displaying a GUI (Graphic User Interface) on a screen; a sensing unit for sensing whether or not the steering wheel is rotated; and a controller for controlling the display unit to rotate a GUI element included in the GUI in an opposite direction of the rotation direction of the steering wheel so as to be displayed on the screen, when the steering wheel is rotated.

According to embodiments disclosed in the present disclosure, since GUI elements are rotated in the opposite direction of the rotation direction of the steering wheel according to the rotation of the steering wheel installed in the vehicle, the display device having increased visibility and operability is disclosed. In this context, the display device may be a display device providing a GUI (or a screen, an image, etc.) synchronized to the rotation (or movement) of the steering wheel.

FIG. 1 is a block diagram illustrating a configuration of a display device according to embodiments disclosed in the present disclosure.

With reference to FIG. 1, a display device 100 may include a controller 110, a sensing unit 120, and a display unit 130.

Also, the display device according to embodiments disclosed in the present disclosure may further include a memory unit (not shown) for storing various types of information processed by the display device 100.

Besides, the display device 100 may further include various components for providing a GUI synchronized to the steering wheel of a vehicle.

The components illustrated in FIG. 1 are not essential and the display device 100 may be implemented to have more components or fewer components.

Hereinafter, the components will be described in turn.

The controller 110 may perform various functions for providing a GUI synchronized to the steering wheel of the vehicle.

Basically, the controller 110 may play a role of controlling the components of the display device 100.

When the steering wheel is rotated, the controller 110 may control the display unit 130 to rotate the GUI element included in a GUI (Graphic User Interface) in relation to the vehicle in an opposite direction of a rotation direction of the steering wheel and display it.

The rotation of the GUI element will be described in detail with reference to FIGS. 3A to 3B.

Also, the controller 110 may rotate the GUI element based on a rotation angle of the steering wheel. In this case, the GUI element may be rotated by a particular angle.

In this case, the controller 110 may rotate the GUI element such that an absolute value of the particular angle is identical to that of the rotation angle of the steering wheel.

The rotation of the GUI element based on the rotation angle of the steering wheel will be described in detail with reference to FIGS. 4A and 4B.

Also, the controller 110 may provide an editing function with respect to the GUI.

Here, the editing function may be a function of setting at least one of a size, a shape, a kind, a position, a color of the GUI element displayed on the screen, and whether the GUI element is rotated according to a rotation of the steering wheel.

Also, the controller 110 may activate the editing function based on a user selected input. And perform the editing function with respect to the GUI.

The editing function with respect to the GUI will be described in detail with reference to FIGS. 5A and 5B.

Also, the controller 110 may control the display unit to display a particular GUI based on situation information regarding the vehicle on the screen.

Here, the situation information regarding the vehicle may be information regarding at least one of an operation state of the vehicle, a running situation of the vehicle, an emergency situation of the vehicle, a state of a device connected to the vehicle, and a state of a terminal connected to the vehicle.

Also, the controller 110 may determine a particular GUI element to be displayed on the screen based on the sensed situation information, and the particular GUI may include the particular GUI element.

The particular GUI based on the situation information regarding the vehicle will be described in detail with reference to FIG. 6.

The display unit 130 may play a role of displaying (or outputting) information processed in the display device 100. The information may be displayed on or output to a particular screen.

Also, when the display device performs a particular function, the display unit 130 may display a UI (User Interface) or a GUI (Graphic User Interface) in relation to the particular function.

For example, the particular function performed in the display device may include a function in relation to an AVN (Audio/Video/Navigation) system, a function of displaying information in relation to running of the vehicle, a function of displaying a state of a vehicle, a function in relation to a device (or a terminal) connected to the vehicle, a touch button function for adjusting (or controlling) the foregoing functions, and the like.

The display unit 130 may include at least one of a liquid crystal display (LCD), a thin film transistor-liquid crystal display (TFT LCD), an organic light-emitting diode (OLED), a flexible display and a 3D display, and an e-ink display.

Some of these displays may be configured as transparent or light-transmissive displays through which a user may see the outside. These displays may be called as transparent displays. A representative example of the transparent displays may be a transparent OLED (TOLED), and the like.

The rear structure of the display unit 130 may also be configured as a light-transmissive structure. Through such a structure, the user can see an object positioned at the rear of the body of the display device through an area occupied by the display unit 130.

Various types of visual information may be displayed on the display unit 130. The information may be displayed in the form of character, number, symbol, graphic, icon, or the like, and may be configured as a 3D stereoscopic image.

The display unit 130 may be operated as a whole region or may be divided into a plurality of regions so as to be accordingly operated. In the latter case, the plurality of regions may be operated in association with each other.

For example, an output window and an input window may be displayed at upper and lower portions of the display unit 130, respectively. Soft keys including numbers for inputting a phone number, or the like, may be output to the input window. When a soft key is touched, a number corresponding to the touched soft key is displayed on the output window. When the manipulation unit is manipulated, a call connection with respect to a phone number displayed on the output window is attempted, or text displayed on the output window may be input to an application.

The display unit 130 may be configured to receive a touch through scrolling. The user may move a cursor or a pointer positioned on an entity, e.g., an icon, or the like, displayed on the display unit 130 by scrolling the display unit 130. In addition, when the user moves his finger on the display unit 130, the path along which the user's finger moves may be visually displayed on the display unit 130. This will be useful in editing an image displayed on the display unit 130.

The display unit 130 may include a touch screen. For example, one function of the display device 100 may be executed in case that the touch screen of the display unit 130 is touched in conjunction within a certain time range. The touches in conjunction may be clamping the body of the display device with the user's thumb and index finger. The one function may be, for example, activation or deactivation of the display unit 130.

The memory unit (not shown) may play a role of storing information processed in the display device 100.

The memory unit may store various user interfaces (UIs) and/or graphic user interfaces (GUIs) in relation to functions performed by the display device 100.

According to an embodiment disclosed in the present disclosure, the memory unit may play a role of storing a GUI in relation to the vehicle.

Also, the memory unit stores data, programs, and the like, required for the display device 100 to operate.

The memory 130 may include at least one type of storage medium including a flash memory, a hard disk type, a multimedia card micro type, a card-type memory (e.g., SD or XD memory, etc), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Also, the display device 100 may operate a web storage performing a storage function of the memory unit on the Internet, or may be operated in relation to the web storage device.

Control Method of Display Device According to Embodiments Disclosed in the Present Disclosure A control method of the display device according to embodiments of the present invention may include a step of displaying a GUI (Graphic User Interface) in relation to a vehicle; a step of determining whether a steering wheel of the vehicle is rotated; and a step of rotating a GUI element included in a GUI in an opposite direction of a rotation direction of the steering wheel and displaying the GUI element on a screen, when the steering wheel is rotated.

Figure 2:
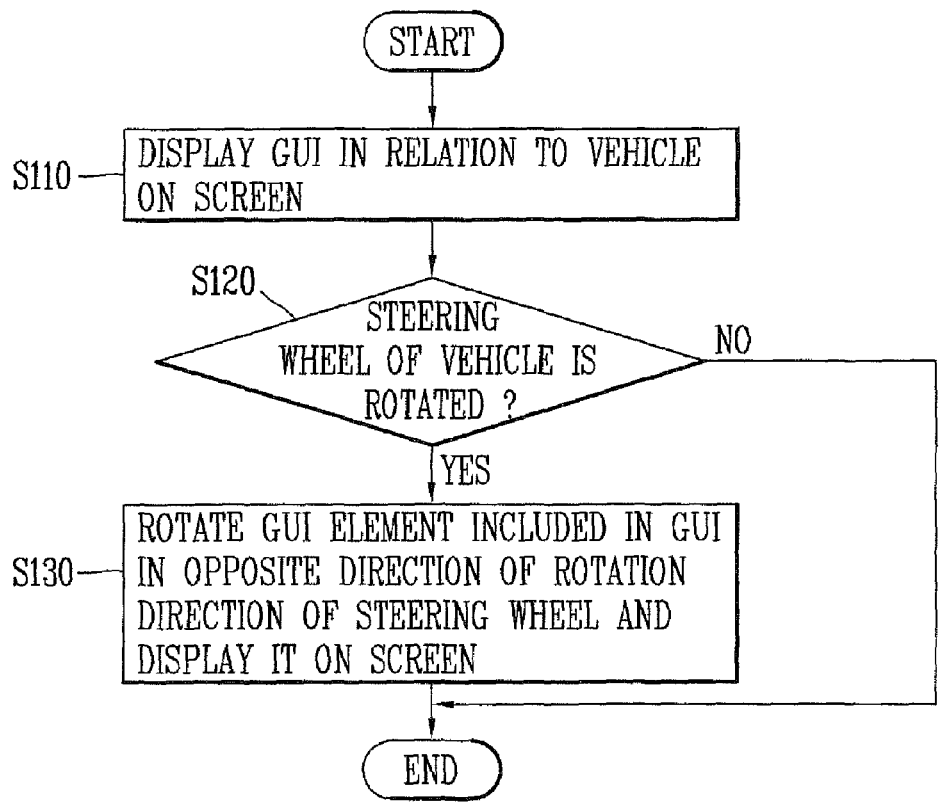
FIG. 2 is a flow chart illustrating a control method of a display device according to an embodiment disclosed in the present disclosure.

FIG. 2 is a flow chart illustrating a control method of a display device according to an embodiment disclosed in the present disclosure.

With reference to FIG. 2, a control method of a display device according to embodiments disclosed in the present disclosure may include the following steps.

First, a display device may display a GUI in relation to a vehicle on a screen (S110).

Next, the display device may detect whether a steering wheel of the vehicle is rotated (S120).

And then, when the steering wheel is rotated, the display device may rotate a GUI element of the GUI in an opposite direction of the rotation direction of the steering wheel to display it on the screen (S130).

When the steering wheel is not rotated or when the GUI element is rotated and displayed on the screen, controlling of the display device according to embodiments disclosed in the present disclosure is terminated.

First Embodiment

Display Device Providing GUI Including Rotated GUI Element

The first embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the first embodiment disclosed in the present disclosure.

The display device according to the first embodiment disclosed in the present disclosure may include a GUI (Graphic User Interface) in relation to a vehicle on the screen, a sensing unit for sensing whether the steering wheel is rotated, and a controller for controlling the display unit to rotate a GUI element included in the GUI in an opposite direction of a rotation direction of the steering wheel to display it on the screen, when the steering wheel is rotated.

In detail, the display device according to the first embodiment disclosed in the present disclosure may provide a GUI synchronized according to a rotation of the steering wheel or an image corresponding to the GUI. Namely, the display device according to the first embodiment disclosed in the present disclosure may rotate a GUI or the entire pixels corresponding to an image corresponding to the GUI by a rotation angle of the steering wheel based on a particular axis so that the GUI or the image corresponding to the GUI displayed on the display device can be maintained although the display device itself is turned (or rotated) according to the rotation of the steering wheel. Here, the particular axis may refer to a central axis of the rotation of the steering wheel or a central axis of the screen of the display device.

According to the first embodiment disclosed in the present disclosure, the GUI element may be at least one of an indicator indicating information regarding running of the vehicle, an indicator indicating a state of the vehicle, an indicator in relation to a device connected to the vehicle, an indicator in relation to a terminal connected to the vehicle, an image obtained by capturing the outside of the vehicle, and a touch button.

Figure 3A:
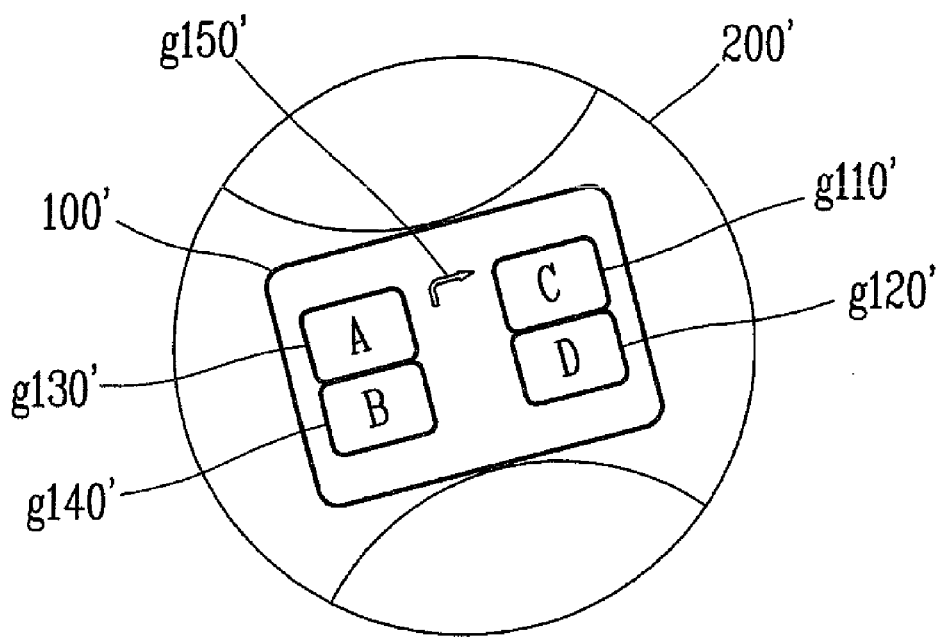
FIGS. 3A and 3B are exemplary views illustrating a display device according to a first embodiment disclosed in the present disclosure.
Figure 3B:
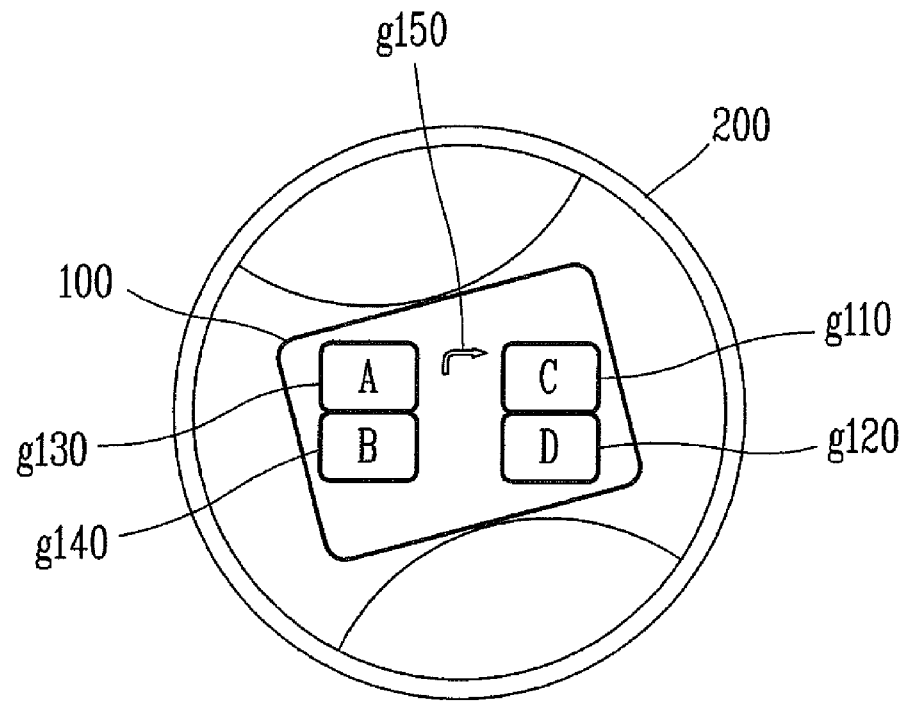

FIGS. 3A and 3B are exemplary views illustrating a display device according to a first embodiment disclosed in the present disclosure.

With reference to FIG. 3A, a steering wheel 200' may include a display device 100', and the display device 100' may display a GUI including various GUI elements g110'~g150' on the screen.

As described above, the GUI elements g110'~g150' may be at least one of an indicator indicating information regarding running of the vehicle, an indicator indicating a state of the vehicle, an indicator in relation to a device connected to (or installed in) the vehicle, an indicator in relation to a terminal connected to (or installed in) the vehicle, an image obtained by capturing the outside of the vehicle, and a touch button.

Here, the indicator indicating information regarding running of the vehicle may indicate at least one of major vehicle information such as left/right blinker information g150', information regarding an excess of a limit speed, forward/backward alarm in parking, information regarding a dangerous interval between a front vehicle and a rear vehicle, and navigation information for guiding a road.

Also, the indicator indicating a state of the vehicle may indicate information regarding opening of a vehicle door, information regarding when a safety belt is not taken, or information to be indicated in the occurrence of a situation such as a dangerous remaining capacity of oil, or the like.

Also, the indicator in relation to a device or a terminal connected to the vehicle may indicate information regarding a multimedia device, a portable terminal (or a mobile terminal) connected to the vehicle. For example, when a video player (e.g., a DVDP) is connected to the vehicle, the indicator in relation to a device connected to the vehicle may indicate information regarding an operational state of the video player. Also, for example, the indicator in relation to a terminal connected to the vehicle may indicate information (e.g., whether or not there is an incoming call, whether or not a message is received, etc.) regarding an operation of a portable terminal when the portable terminal is connected to the vehicle.

Also, an image obtained by capturing the outside of the vehicle may inform a user (or driver) of the vehicle about a state of outside of the vehicle, thus providing information for driving safely. For example, the image obtained by capturing the outside of the vehicle may include a camera view with respect to a blind spot outside the vehicle, a camera view with respect to a front blind spot or the vicinity of a front buffer, or the like, when the vehicle starts or when a front obstacle is sensed.

Also, the touch button may be related to running, a state, adjustment, or a manipulation of a device (or terminal) connected to (or installed in) the vehicle. For example, the touch button may be a touch button in relation to adjusting a volume of the multimedia device installed in the vehicle.

When the steering wheel 200' is rotated according to a manipulation of the vehicle user (or driver), the GUI elements g110'~g150' may be rotated to be seen to the user as shown in FIG. 3A.

In this case, due to the rotated GUI elements g110'~g150', the user may have a difficulty in manipulating the vehicle and recognizing various types of information regarding the vehicle through the GUI including the GUI elements g110'~g150'.

Thus, the display device according to the first embodiment disclosed in the present disclosure may provide a GUI synchronized with the steering wheel in order to increase visibility and operability.

With reference to FIG. 3B, the display device 100 according to the first embodiment disclosed in the present disclosure may provide a GUI synchronized with a rotation (or movement) of the steering wheel 200, Namely, according to the first embodiment, when the steering wheel 200 is rotated, the display device 100 may rotate the GUI elements g110~g150 in an opposite direction of the rotation direction of the steering wheel 200 to display the rotated GUI elements g110~g150 on the screen. In this case, in the aspect that the GUI elements g110~g150 are automatically rotated to be displayed according to the rotation of the steering wheel, the GUI is considered to be synchronized with the steering wheel.

In this case, the user (or the driver) of the vehicle can easily manipulate the vehicle and easily recognize various types of information regarding the vehicle through the synchronized GUI.

According to a modification of the first embodiment, the display device 100 may recognize the user's (or driver's) eyes of the vehicle, and rotate the GUI based on the recognized user's eyes.

For example, when the user's eyes face a central portion of the steering wheel, the display device 100 may rotate the GUI in an opposite direction of the rotation direction of the steering wheel, although the steering wheel is rotated, to provide a GUI fixed to the user's eyes.

There may be various methods for recognize user's eyes. For example, a user's pupil may be detected through a camera to recognize the user's eyes. To this end, the display device 100 may include one or more cameras (not shown). Besides, it is obvious for a skilled person in the art that various other methods for recognizing the user's eyes are applicable to the display device according to an embodiment disclosed in the present disclosure.

Second Embodiment

Rotation of GUI Element Based on Rotation Angle of Steering Wheel

The second embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the second embodiment disclosed in the present disclosure.

The display device according to the second embodiment disclosed in the present disclosure may include a GUI (Graphic User Interface) in relation to a vehicle on the screen, a sensing unit for sensing whether the steering wheel is rotated, and a controller for controlling the display unit to rotate a GUI element included in the GUI in an opposite direction of a rotation direction of the steering wheel to display it on the screen, when the steering wheel is rotated.

According to the second embodiment disclosed in the present disclosure, the sensing unit may detect a rotation angle of the steering wheel.

Also, according to the second embodiment disclosed in the present disclosure, the controller may rotate the GUI element based on a rotation angle of the steering wheel. Here, the GUI element may be rotated by a particular angle.

Figure 4A:
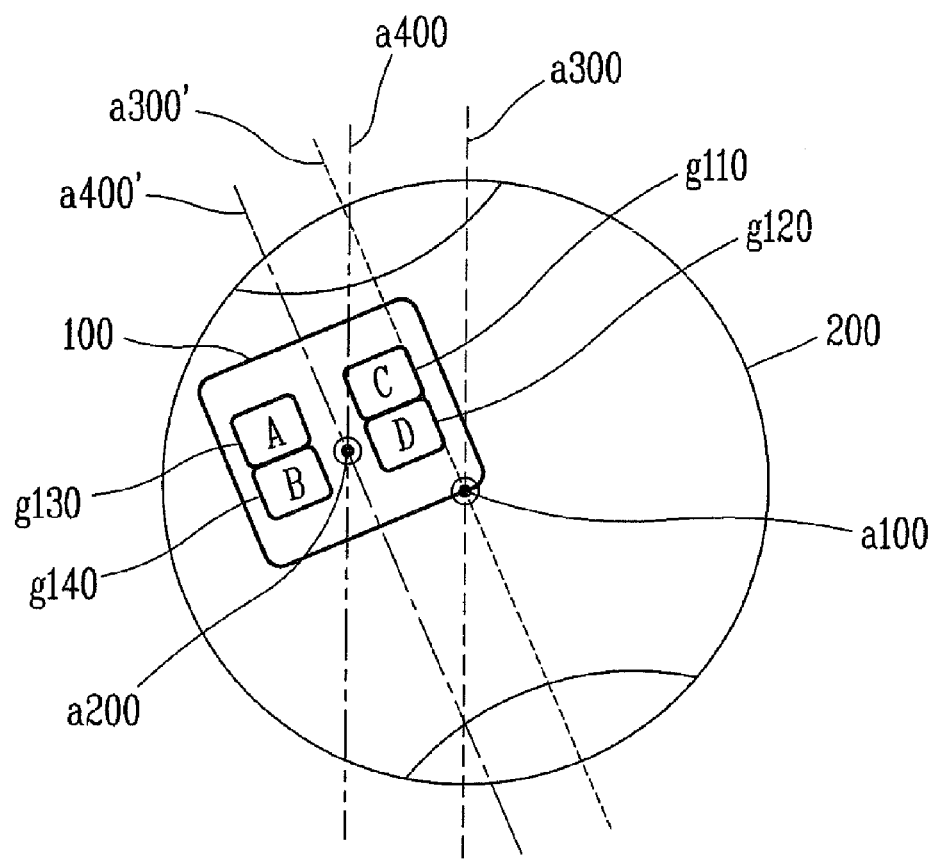
FIGS. 4A and 4B are exemplary views illustrating a display device according to a second embodiment disclosed in the present disclosure.
Figure 4B:
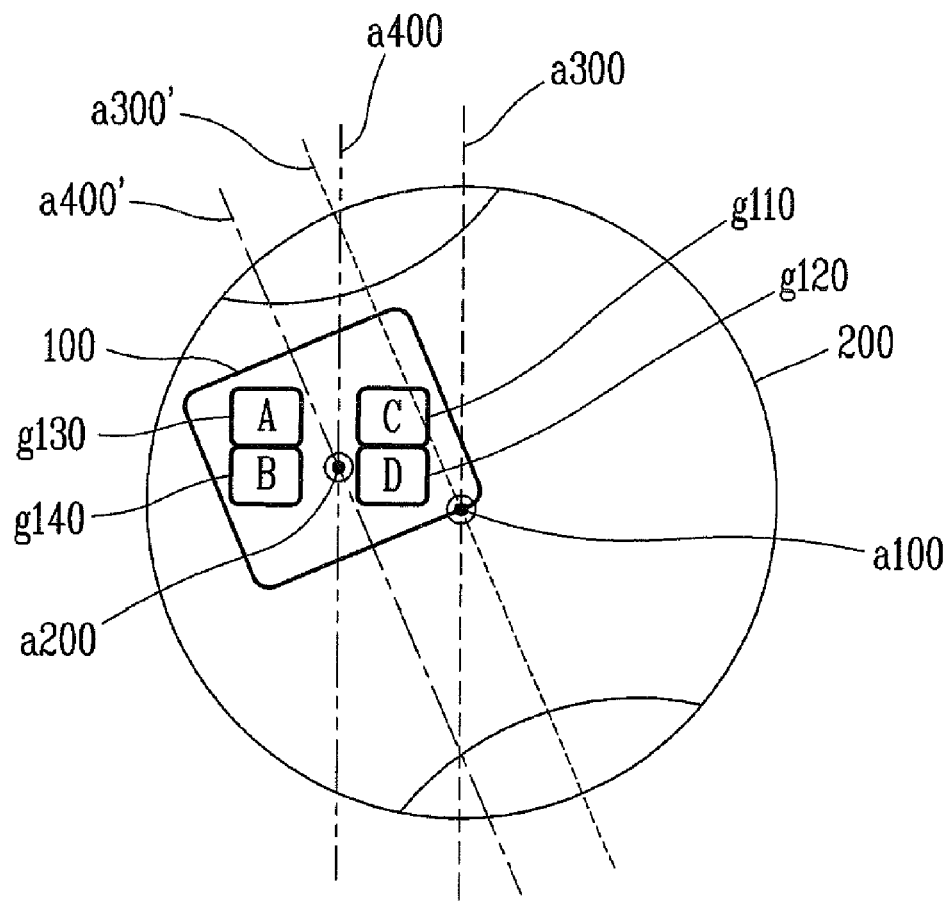

FIGS. 4A and 4B are exemplary views illustrating a display device according to a second embodiment disclosed in the present disclosure.

Referring to FIG. 4A, the steering wheel 200 may be rotated based on a first axis a100 according to a manipulation of the driver of the vehicle.

According to an embodiment disclosed in the present disclosure, the first axis a100 may be a rotation central axis of the steering wheel 200. Here, the rotation central axis may be a central axis based on which the steering wheel 200 is fixed to the vehicle.

In this case, the GUI elements g110~g140 included in the GUI provided by the display device are also rotated to be seen to the driver. Thus, as described above, visibility and operability with respect to the GUI may be reduced.

As shown in FIG. 4A, a rotation angle of the steering wheel 200 may be determined based on a first reference axis a300, and a rotated angle of the GUI elements g110~g140 may be determined based on a second reference axis a400.

Namely, a rotation angle of the steering wheel 200 may be determined (or detected) based on the first reference axis a300 and a rotated axis a300' of the first reference axis, and a rotated angle of the GUI elements g110~g140 may be determined based on the second reference axis a400 and a rotated axis a400' of the second reference axis.

According to an embodiment disclosed in the present disclosure, the first reference axis a300 may be vertical to the rotation central axis of the steering wheel or cross (or intersect with) the rotation central axis of the steering wheel.

Also according to an embodiment disclosed in the present disclosure, the second reference axis a400 may be vertical to the rotation central axis of the steering wheel 200 and parallel to the first reference axis a300.

For example, when an angle between the first reference axis a300 and the rotated axis a300' of the first reference axis is 30 degrees, a rotation angle of the steering wheel may be detected as 30 degrees. Also, for example, when an angle between the second reference axis a400 and the rotated axis a400' of the second reference axis is 30 degrees, a rotated angle of the GUI elements g110~g140 may be determined to be 30 degrees.

With reference to FIG. 4B, the display device 100 may rotate the GUI elements g110~g140 based on a rotation angle of the steering wheel 200. Here, the GUI elements g110~g140 may be rotated by a particular angle.

According to the second embodiment, the rotation angle of the steering wheel 200 may be detected (or sensed) by the sensing unit 120.

As described above, the rotation angle of the steering wheel 200 may be detected based on the first reference axis a300. Also, the first reference axis a300 may be vertical to the rotation central axis of the steering wheel or cross (or intersect with) the rotation central axis of the steering wheel. For example, when an angle between the first reference axis a300 and the rotated axis a300' of the first reference axis is 40 degrees, a rotation angle of the steering wheel 200 may be detected to be 40 degrees.

According to the second embodiment disclosed in the present disclosure, the steering wheel 200 may be rotated based on the first axis a100, and the GUI elements g110~g140 may be rotated based on the second axis a200.

Also, according to the second embodiment disclosure, the first axis a100 may be a rotation central axis of the steering wheel, and the second axis a200 may be the same as the first axis a100. However, FIG. 4B shows a case that the second axis a200 is different from the first axis a100.

As described above, the display device 100 may rotate the GUI element by a particular angle based on the detected rotation angle of the steering wheel 200.

According to the second embodiment, the display device 100 may rotate the GUI elements g110~g140 such that an absolute value of the particular angle is equal to an absolute value of the rotation angle of the steering wheel 200.

In this case, since the absolute value of the particular angle is equal to the absolute value of the rotation angle of the steering wheel 200, the driver of the vehicle may have an effect that he sees the GUI as that before the steering wheel 200 was rotated.

According to the second embodiment, the particular angle may be determined based on the second reference axis a400.

Here, the second reference axis may be vertical to the rotation central axis of the steering wheel 200 and parallel to the first reference axis.

For example, in FIG. 4B, when a rotation angel of the steering wheel 200 is detected to be 50 degrees in a counterclockwise direction based on the first reference axis a300, the particular angle may be 50 degrees in a clockwise direction based on the second reference axis a400, and the display device may rotate the GUI elements g110~g140 in the clockwise direction by 50 degrees based on the second reference axis.

Third Embodiment

Editing Function of GUI

The third embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the third embodiment disclosed in the present disclosure.

The display device according to the third embodiment disclosed in the present disclosure may include a GUI (Graphic User Interface) in relation to a vehicle on the screen, a sensing unit for sensing whether the steering wheel is rotated, and a controller for controlling the display unit to rotate a GUI element included in the GUI in an opposite direction of a rotation direction of the steering wheel to display it on the screen, when the steering wheel is rotated.

Also, according to the third embodiment disclosed in the present disclosure, the controller may provide an editing function with respect to the GUI.

Figure 5A:
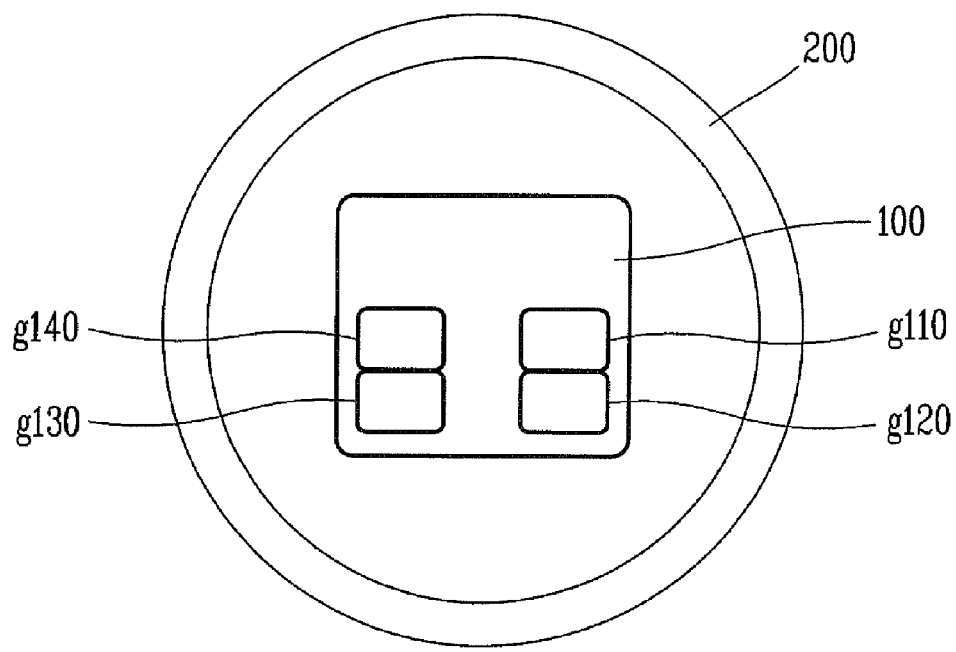
FIGS. 5A and 5B are exemplary views illustrating a display device according to a third embodiment disclosed in the present disclosure.
Figure 5B:
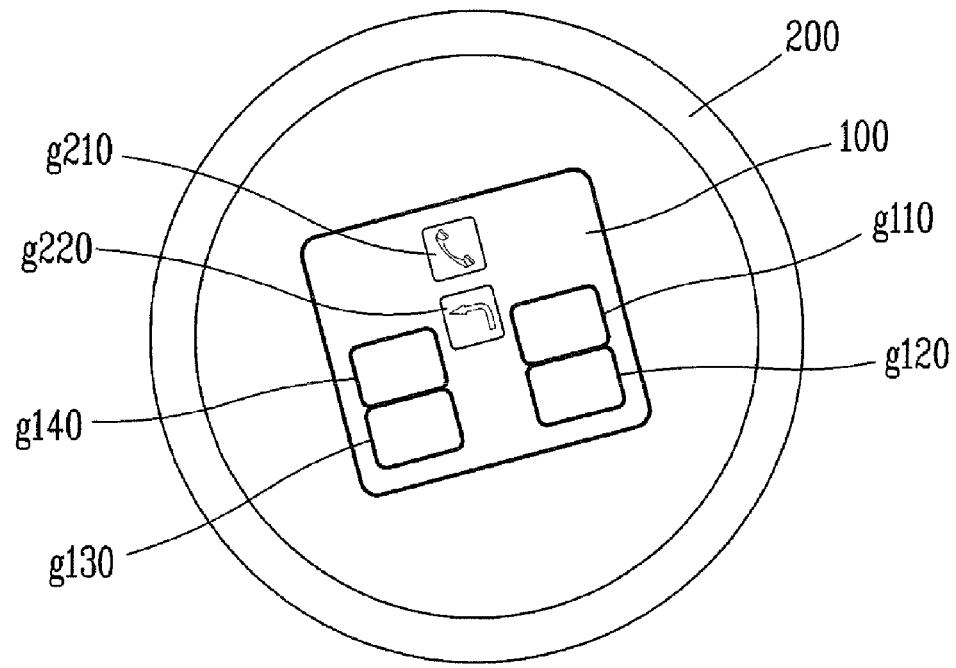

FIGS. 5A and 5B are exemplary views illustrating a display device according to a third embodiment disclosed in the present disclosure.

With reference to FIGS. 5A and 5B, the display device 100 according to the third embodiment disclosed in the present disclosure may provide an editing function with respect to the GUI in relation to a vehicle.

The editing function may be a function of setting at least one of a type, a size, a shape, a kind, a position, and a color of a GUI element displayed on the screen, and whether to rotate the GUI element according to a rotation of the steering wheel.

The editing function may aim at providing the user (or the driver) of the vehicle with the opportunity of editing a type, a position, or the like, of basic information desired to be displayed on the screen.

According to the third embodiment disclosed in the present disclosure, the controller 110 may activate the editing function based on an input of a user selection, and perform an editing function on the GUI based on the user's editing input.

With reference to FIG. 5A, the user (or the driver) of the vehicle may activate the editing function by applying a selective input to the display device 100 (or by manipulating the display device), and edit a screen corresponding to the GUI in a general situation.

In this case, the GUI corresponding to a general situation may be the GUI elements g110~g140 corresponding to a basic setting.

The GUI elements g110~g140 included in the basic setting may be a touch button (e.g., volume control, or the like) in relation to manipulation of the multimedia device (e.g., a radio, a DVD player, or a navigation device) installed in the vehicle, a touch button (e.g., ON/OFF of a left/right rotation blinker) in relation to an operation of the vehicle, an indicator indicating a state of the vehicle (indication of a remaining amount of oil, opening of a vehicle door, an excess of a limit speed, forward/backward alarm in parking, a dangerous interval between a front vehicle and a rear vehicle, safety belt not taken, and the like).

Namely, the GUI elements g110~g140 included in the basic setting may include a touch button (or a touch input button) for adjusting various vehicle functions or an AVN (Audio/Video/Navigation system) function.

With reference to FIG. 5B, a screen corresponding to a GUI while the vehicle is running may be edited through the editing function.

In this case, the GUI during running may include an indicator g210 indicating an operational state (e.g., reception of an incoming call, or the like) of the mobile terminal connected to the vehicle and an indicator g220 indicating a running situation (e.g., a left/right rotation situation) of the vehicle.

In addition, according to the third embodiment disclosed in the present disclosure, the user may edit a type, a position, or the like, of the touch button in relation to a particular function as described to use it.

Also, the GUI element (e.g., the touch button) may be synchronized with a movement (or rotation) of the steering wheel or may be set to be moved integrally with the steering wheel. Namely, whether to synchronize the GUI element (or whether too rotate the GUI element according to a movement of the steering wheel) may be an option for user convenience and the user may freely determine the option.

Fourth Embodiment

Display of GUI Based on Vehicle Situation

The fourth embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the fourth embodiment disclosed in the present disclosure.

The display device according to the fourth embodiment disclosed in the present disclosure may include a GUI (Graphic User Interface) in relation to a vehicle on the screen, a sensing unit for sensing whether the steering wheel is rotated, and a controller for controlling the display unit to rotate a GUI element included in the GUI in an opposite direction of a rotation direction of the steering wheel to display it on the screen, when the steering wheel is rotated.

Also, according the fourth embodiment disclosed in the present disclosure, the sensing unit may sense situation information regarding the vehicle, and the controller may control the display unit to display a particular GUI to be displayed on the screen based on the sensed situation information.

Also, according the fourth embodiment disclosed in the present disclosure, the situation information regarding the vehicle may be information in relation to at least one of an on operational state of the vehicle, a running situation of the vehicle, and an emergency of the vehicle, a state of a device connected to the vehicle, and a state of a terminal connected to the vehicle.

Also, according the fourth embodiment disclosed in the present disclosure, the controller may determine a particular GUI element to be displayed based on the sensed situation information, and the particular GUI may include the particular GUI element.

According the fourth embodiment of another aspect, the particular GUI may include a particular GUI element corresponding to the sensed situation information, and the particular GUI element may be previously set based on a user input.

FIG. 6 is an exemplary view illustrating a display device according to a fourth embodiment disclosed in the present disclosure.

With reference to FIG. 6, the user (or the driver) of the vehicle may determine (or set or edit) a GUI appropriate for a particular situation of the vehicle.

Also, according to an embodiment of another aspect, the sensing unit 120 may sense a particular situation (or situation information) of the vehicle, and the controller 110 may determine a GUI appropriate for the particular situation.

The display device according to the fourth embodiment disclosed in the present disclosure may aim at displaying a GUI to allow the user (or the operator) to easily recognize required information dynamically according to a vehicle state or according to a situation upon recognition of a danger.

FIG. 6(a) shows a GUI displayed on the screen of the display device 100 when the driver turns to the left while driving.

In this case, situation information regarding the vehicle may be a running situation of the vehicle, and the running situation may be a situation in which the vehicle turns to the left.

The sensing unit 120 may sense a situation in which the vehicle turns to the left, and the controller 110 may control the display unit 130 to display a GUI corresponding to the sensed running situation.

Here, the GUI corresponding to the sensed running situation may include GUI elements g110~g140 included in a basic setting and an indicator g310 indicating a left turn as a particular GUI element corresponding to the sensed running situation.

FIG. 6(b) shows a GUI displayed on the screen of the display device 100 when an emergency occurs with respect to the vehicle.

In this case, the situation information regarding the vehicle is an emergency situation of the vehicle, and the emergency situation may be a fire situation within the vehicle, an overheated engine, or the like.

The sensing unit 120 may sense the vehicle emergency situation, and the controller 110 may control the display unit 130 to display a GUI corresponding to the sensed emergency situation.

Here, the GUI corresponding to the sensed emergency situation may include the GUI elements g110~g140 included in the basic setting and an indicator g320 indicating a fire or an overheated engine as a particular GUI element corresponding to the sensed emergency situation.

FIG. 6(c) shows a GUI displayed on the screen of the display device 100 when an incoming call is received by a mobile terminal connected to the vehicle.

In this case, the situation information regarding the vehicle may be an operational state of the mobile terminal connected to the vehicle, and the operational state may be a state in which the mobile terminal receives an incoming call.

The sensing unit 120 may sense an operational state of the mobile terminal, and the controller 110 may control the display unit 130 to display a GUI corresponding to the sensed operational state of the mobile terminal.

Here, the GUI corresponding to the operational state of the mobile terminal may include the GUI elements g110~g140 included in the basic setting and an indicator g330 indicating reception of the incoming call as a particular GUI element corresponding to the operational state of the mobile terminal.

In addition, according to the fourth embodiment disclosed in the present disclosure, the display device 100 may display a blind spot camera view (e.g., a camera image of the vicinity of a front blind spot/front bumper when the vehicle starts or when a front obstacle is sensed) according to the sensed situation information.

Also, the display device 100 may display the indicator indicating information in relation to security such that it is dynamically enlarged or flickers (e.g., it is displayed when the driver does not take a seat belt, the vehicle door is open, the vehicle exceeds a limit speed, or there is a danger in relation to a remaining amount of oil, or the like).

Also, the display device 100 may flickers an icon or increases frequency of a beep sound according to dangerous grade to display it or output (for example, frequency of flickering is increased as a distance becomes closer when there is a risk of collision of the front and the rear).

Also, the display device 100 may display a touch button having the highest possibility of being used according to a state of the vehicle.

Also, the display device 100 may flicker a related touch button according to a situation or display neon lights. According to this, the user may be guided to easily find a desired touch button.

Fifth Embodiment

Disposition of Display Unit

The fifth embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the fifth embodiment disclosed in the present disclosure.

The display device according to the fifth embodiment disclosed in the present disclosure may include a GUI (Graphic User Interface) in relation to a vehicle on the screen, a sensing unit for sensing whether the steering wheel is rotated, and a controller for controlling the display unit to rotate a GUI element included in the GUI in an opposite direction of a rotation direction of the steering wheel to display it on the screen, when the steering wheel is rotated.

Also, according to the fifth embodiment disclosed in the present disclosure, the display unit may be disposed at the center or edge of the steering wheel.

Figure 7A:
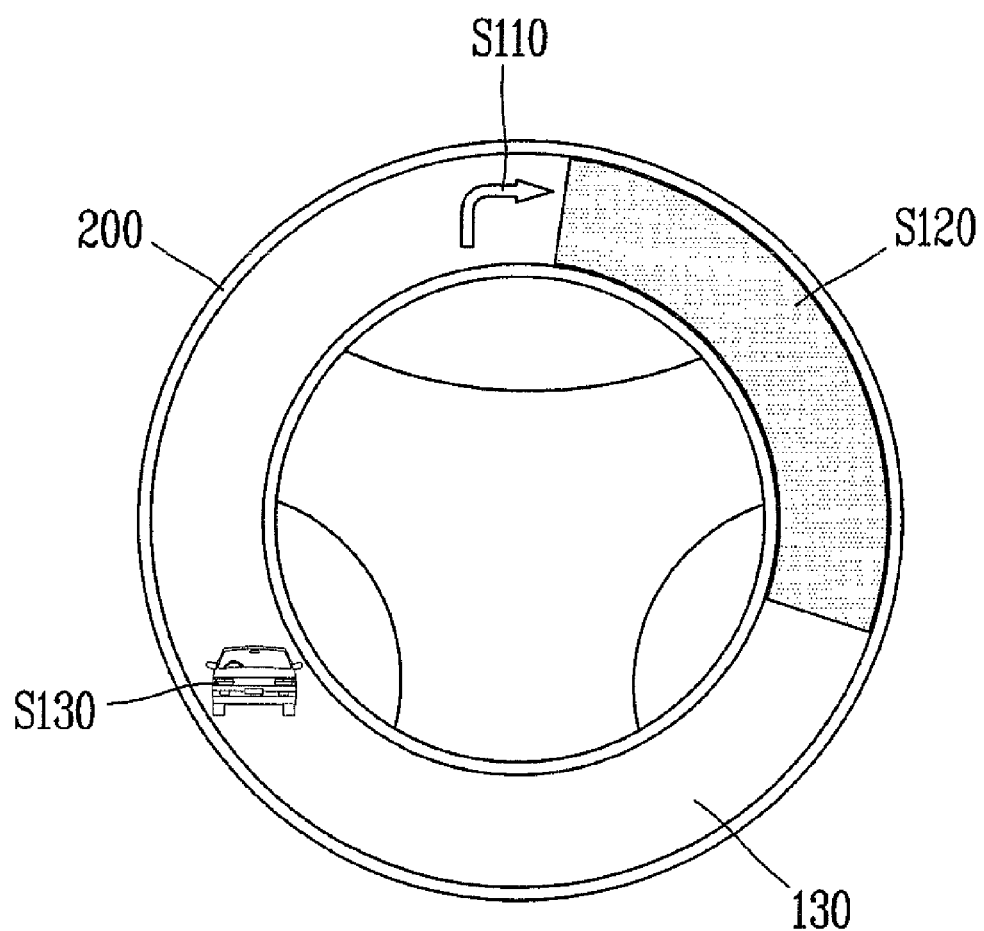
FIGS. 7A and 7B are conceptual views illustrating a display device according to a fifth embodiment disclosed in the present disclosure.
Figure 7B:
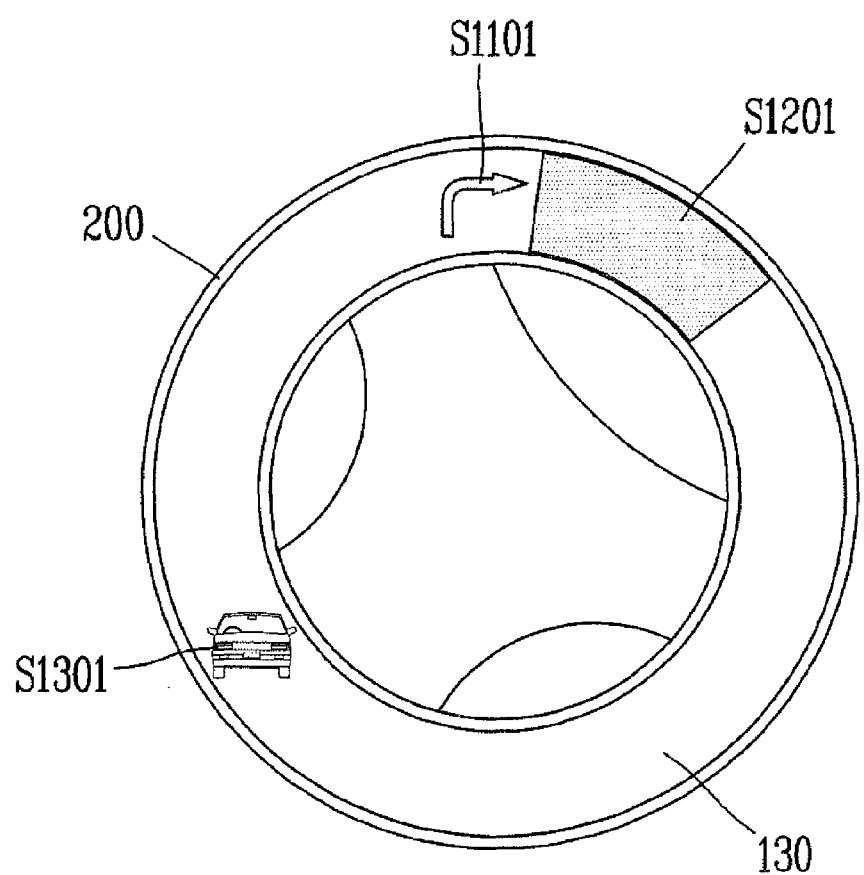

FIGS. 7A and 7B are conceptual views illustrating a display device according to a fifth embodiment disclosed in the present disclosure.

Referring to FIG. 7A, the display device 100 installed on the steering wheel 200 includes a display unit 130, and the display unit 130 is disposed on the edge of the steering wheel.

Also, the display unit 130 includes a plurality of screen regions S110~S130.

For example, an indicator indicating a running situation (e.g., a left turn) of the vehicle may be displayed in the first screen region S110.

Also, for example, an indicator (or a gauge) indicating an amount of rotation of the steering wheel 120 may be displayed in the second screen region S120.

Also, for example, a camera view of a blind spot of the vehicle may be displayed in the third screen region S130.

The indicator or the camera view may be GUI elements, and the display unit 130 may display a GUI including the GUI elements.

Also, with reference to FIG. 7B, the display device 100 may display a GUI (or a screen corresponding to the GUI) synchronized with a movement (or a rotation) of the steering wheel 200.

Thus, when the steering wheel 200 is rotated, the display device 100 may display indicators S1101 and S1301 rotated in an opposite direction of a rotation direction of the steering wheel in the first screen region S110 and the third screen region S130, and also, display an indicator S1201 having a changed amount of the gage (or the changed amount of rotation) in the third screen region S130.

Thus, visibility and operability of the user with respect to the GUI can be increased.

As described above, according to the fifth embodiment disclosed in the present disclosure, since the display unit 130 is disposed on the handle (or edge portion) of the steering wheel and a GUI synchronized with a movement of the steering wheel is provided, the user can easily check (or recognize) information required for constantly fixed eyes (or position).

Sixth Embodiment

Various Disposition Methods of Display Device

The sixth embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the sixth embodiment disclosed in the present disclosure.

According to the sixth embodiment disclosed in the present disclosure, the display device may be disposed at various positions of the steering wheel.

Figure 8:
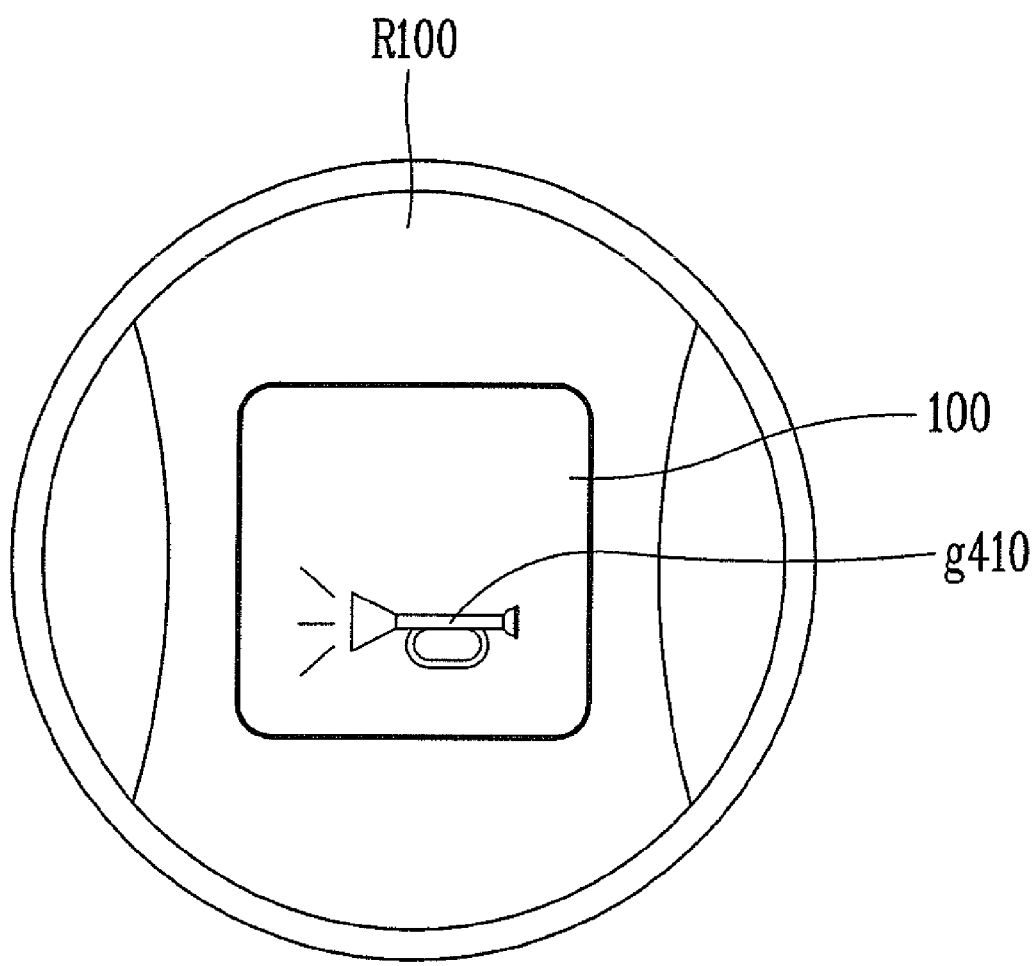
FIG. 8 is an exemplary view illustrating a disposition method of a display device according to a sixth embodiment disclosed in the present disclosure.

FIG. 8 is an exemplary view illustrating a disposition method of a display device according to a sixth embodiment disclosed in the present disclosure.

With reference to FIG. 8, the display device 100 may be disposed at a central portion of the steering wheel, and a horn of the vehicle may be disposed in a first region R100 excluding a region in which the display device 100 is disposed.

In this case, the display device 100 may provide a touch button for operating the horn in the form of a GUI.

Or, the display device 100 itself may be placed on the horn plate, and when the plate is moved, the horn may be operated. In this case, the display device 100 itself may be designed to be placed on the horn plate by hardware.

Or, when other portion (or part) of the center of the steering wheel cover except for the display device 100 is pressed, the horn can be operated.

Figure 9A:
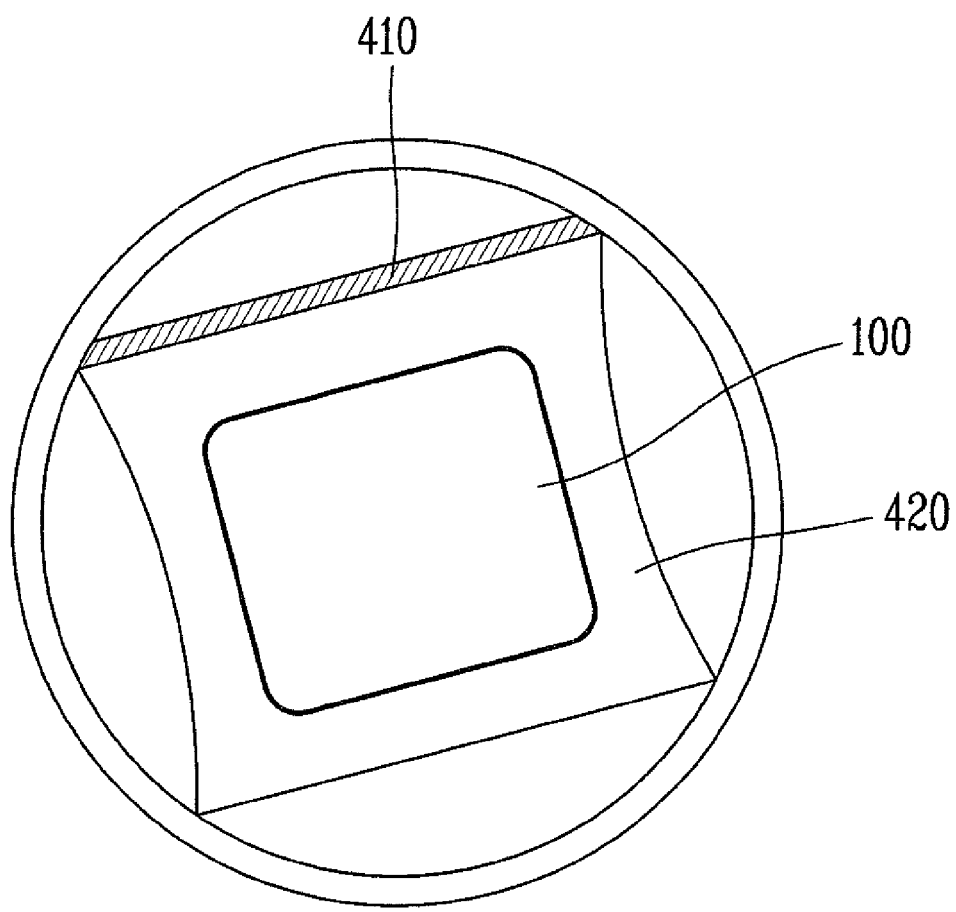
FIGS. 9A and 9B are exemplary views illustrating another disposition method of a display device according to the sixth embodiment disclosed in the present disclosure.
Figure 9B:
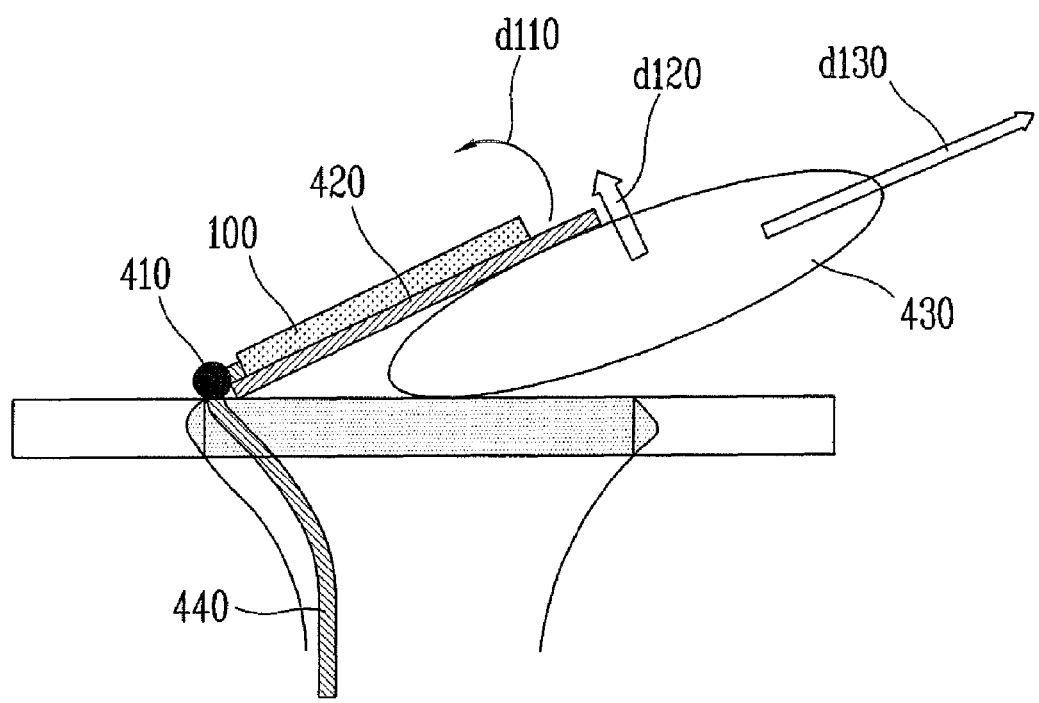

FIGS. 9A and 9B are exemplary views illustrating another disposition method of a display device according to the sixth embodiment disclosed in the present disclosure.

With reference to FIGS. 9A and 9B, when an air bag 430 of the vehicle is based on a scheme that a cover 420 at a central portion of the steering wheel 200 is open, the central portion cover 420 may be open in a first direction (d110).

Also, since a direction in which the air bag 430 is open according to opening of the central portion cover 420 is open is determined (d120, d130), a multi-electric wire 440 in the form of a film may be inserted based on the central portion cover coaxial 410 so that the display device 100 and the air bag 430 can be disposed without being affected each other.

Figure 10A:
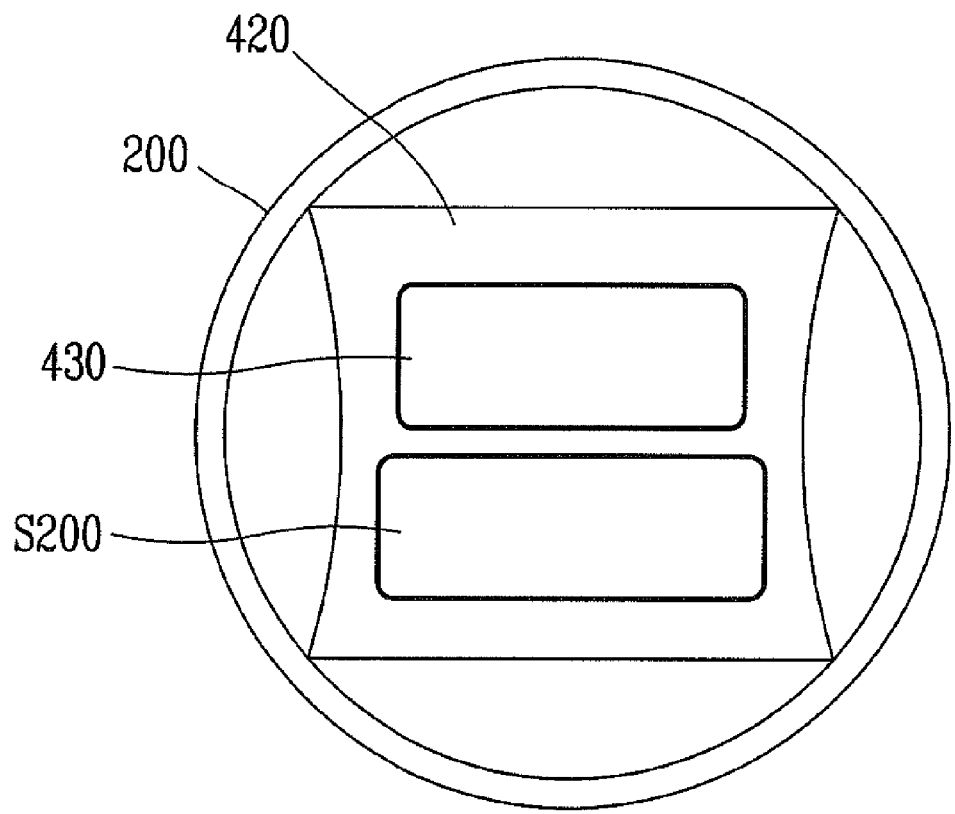
FIGS. 10A and 10B are exemplary views illustrating another disposition method of a display device according to the sixth embodiment disclosed in the present disclosure.
Figure 10B:
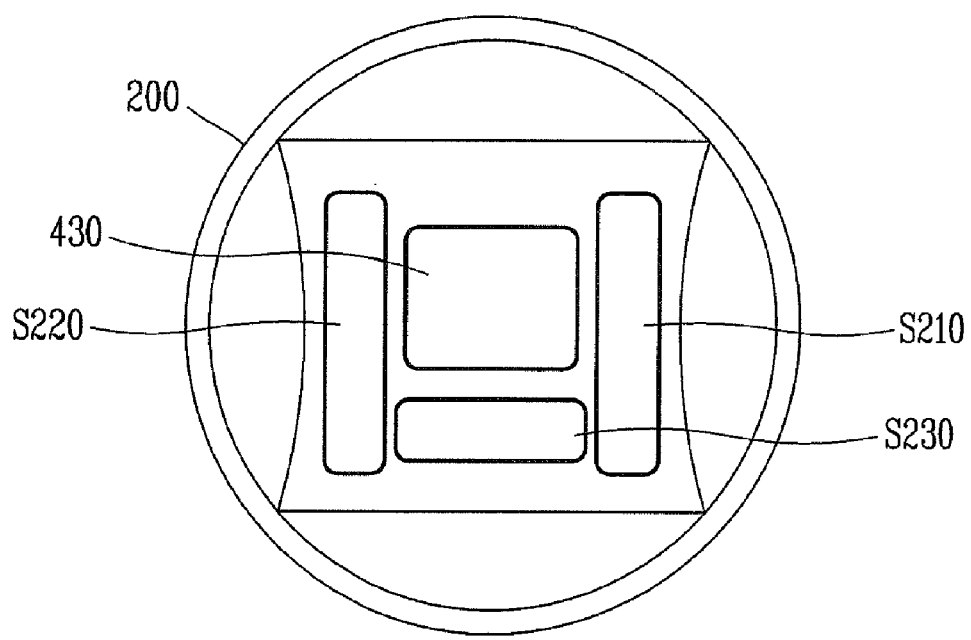

FIGS. 10A and 10B are exemplary views illustrating another disposition method of a display device according to the sixth embodiment disclosed in the present disclosure.

With reference to FIG. 10A, when the air bag 430 of the vehicle is based on a scheme that the air bag 430 inflates as the cover 420 of the central portion of the steering wheel 200 is split up, the display unit 130 of the display device may be disposed in a particular region S200 so as to be separated from the air bag 430, and thus, the display unit 130 and the air bag may not be affected by each other.

Also, with reference to FIG. 10B, the display unit 130 may be disposed to be divided into a plurality of sub-regions S210~S230 existing around the air bag 430.

In addition to the placement of the various methods can be applied to the placement of the display device according to the herein disclosed embodiment this will be apparent to those skilled in the art.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A display device installed on a steering wheel of a vehicle having an airbag and a central portion cover covering the airbag, the display device comprising:
   a display unit disposed on the central portion cover and configured to display a GUI (Graphic User Interface) having an indicator indicating a rotation of the steering wheel;
   a coaxial disposed one side of the central portion cover and connected to the display unit;
   a multi-electric wire provided in the central portion cover and connected to the display unit;
   a sensing unit configured to sense whether or not the steering wheel is rotated; and
   a controller configured to:
   cause the display unit to display the GUI rotating in an opposite direction of a rotation direction of the steering wheel, when the steering wheel is rotated, and
   cause the display unit to display a gauge of the indicator changing according to an amount of the rotation of the steering wheel,
   wherein a side opposite to that of the coaxial of the central portion cover is able to be opened for operating the airbag.

2. The display device of claim 1, wherein the indicator includes at least one of information regarding a running of the vehicle, an indicator indicating a state of the vehicle, an indicator in relation to a device connected to the vehicle, an indicator in relation to a terminal connected to the vehicle, an image obtained by capturing the outside of the vehicle, and a touch button.

3. The display device of claim 1, wherein the steering wheel is rotated based on a first axis, and the GUI is rotated based on a second axis.

4. The display device of claim 3, wherein the first axis is a rotation central axis of the steering wheel, and the second axis is the same as the first axis.

5. The display device of claim 1, wherein the sensing unit is further configured to sense a rotation angle of the steering wheel.

6. The display device of claim 5, wherein the sensing unit is further configured to sense the rotation angle of the steering wheel based on a first reference axis.

7. The display device of claim 6, wherein the first reference axis is vertical to and crosses a rotation central axis of the steering wheel.

8. The display device of claim 6, wherein the controller is further configured to rotate the GUI by a particular angle based on the sensed rotation angle of the steering wheel.

9. The display device of claim 8, wherein the controller is further configured to rotate the GUI such that an absolute value of the particular angle is equal to an absolute value of the rotation angle of the steering wheel.

10. The display device of claim 9, wherein the particular angle is determined based on a second reference axis, and
    wherein the second reference axis is vertical to a rotation central axis of the steering wheel and is parallel to the first reference axis.

11. The display device of claim 1, wherein the controller is further configured to provide an editing function with respect to the GUI.

12. The display device of claim 11, wherein the editing function includes setting at least one of a type, size, a shape, a kind, a position, a color of a GUI element in the displayed GUI, or whether the GUI is rotated according to the rotation of the steering wheel.

13. The display device of claim 12, wherein the controller is further configured to activate the editing function based on a user input, and perform an editing function on the GUI based on the user's input.

14. The display device of claim 1, wherein the sensing unit is further configured to sense situation information regarding the vehicle, and the controller is further configured to display a particular GUI based on the sensed situation information.

15. The display device of claim 14, wherein the situation information regarding the vehicle includes information regarding at least one of an operation state of the vehicle, a running situation of the vehicle, an emergency situation of the vehicle, a state of a device connected to the vehicle, and a state of a terminal connected to the vehicle.

16. The display device of claim 14, wherein the controller is further configured to determine a particular GUI element to be displayed on the particular GUI based on the sensed situation information.

17. The display device of claim 14, wherein the GUI includes a GUI element previously set based on a user input.

18. The display device of claim 1, wherein the display is disposed on a central portion or an edge portion of the steering wheel.

* * * * *